United States Patent [19]

Alejandro Llera

[11] 4,380,299
[45] Apr. 19, 1983

[54] TAMPER PROOF CLOSURE

[75] Inventor: Santos A. A. Alejandro Llera, Rio Piedras, P.R.

[73] Assignee: Precision Plastic Products Corporation, Toa Baja, P.R.

[21] Appl. No.: 185,889

[22] Filed: Sep. 10, 1980

[51] Int. Cl.³ .......................................... B65D 43/14
[52] U.S. Cl. .................................. 215/252; 215/258
[58] Field of Search .............. 215/252, 253, 258, 217; 220/266, 276

[56] References Cited

U.S. PATENT DOCUMENTS

| | | |
|---|---|---|
| 3,032,226 | 12/1960 | Terwilliger . |
| 3,109,547 | 11/1963 | Wood . |
| 3,441,161 | 4/1969 | Van Baarn . |
| 3,784,041 | 1/1974 | Birch ................................ 215/252 |
| 3,874,540 | 4/1975 | Hidding ............................ 215/252 |
| 3,904,062 | 9/1975 | Grussen ........................... 215/252 |
| 3,927,784 | 12/1975 | Cochrane . |
| 3,946,891 | 3/1976 | Picoy . |
| 3,955,696 | 5/1976 | Finke ................................ 215/214 |
| 4,109,814 | 8/1978 | Rausing ........................... 215/217 |
| 4,109,816 | 8/1978 | Faulstich . |
| 4,147,268 | 4/1979 | Patel et al. ....................... 215/252 |
| 4,157,144 | 6/1979 | Weiler et al. .................... 215/252 |
| 4,343,408 | 8/1982 | Csaszar ............................ 215/258 |

FOREIGN PATENT DOCUMENTS

| | | |
|---|---|---|
| 422230 | 11/1965 | France . |
| 92382 | 10/1968 | France . |
| 22181 | 3/1963 | United Kingdom . |
| 1073225 | 6/1967 | United Kingdom . |

Primary Examiner—George T. Hall
Attorney, Agent, or Firm—Kane, Dalsimer, Kane, Sullivan & Kurucz

[57] ABSTRACT

A tamper proof closure for use in combination with a threaded container for spirits or liquor having a retaining means thereon, with said closure having an internally threaded straight side wall and a breakaway portion located thereon which is adapted to slide over the retaining means on the container, the breakaway portion being separated from the remainder of the side wall by a serrated line, said portion being provided with a continuous circumferential extending wedge shaped ring having locking lugs located thereon which are adapted to engage the retaining means to cause the breakaway portion to become detached from the side wall and remain on the container so as to indicate to the consumer tampering thereof.

26 Claims, 8 Drawing Figures

TAMPER PROOF CLOSURE

FIELD OF THE INVENTION

The present invention relates to an improved tamper indicating closure for a liquor or spirit container and the like.

BACKGROUND OF THE INVENTION

There presently exist numerous tamper indicating closures for containers, bottles, etc. These closures come in various materials for example, metals and plastics predominently. Metal however has the disadvantage of being expensive, and prone to leaving sharp edges. In addition experience has proven that the tamper proof evidence in the form of a detachable ring many times will not remain on the neck of the bottle.

The closure may be adapted to allow for a portion thereof to be left on the container after opening as an indicator of tampering. This is often accomplished by requiring the user to pull a tear portion or strip from the closure typically situated between the threads of the closure and the portion remaining on the container to allow the unscrewing of the closure. This requires two operations for removal of the closure in addition to necessitating a discarding of the tear strip.

Other types of closures provide for a breakaway portion which breaks from the closure during unscrewing thereby providing for a single operation, eliminating the tear strip. This type of closure comes in various forms, single piece or ones having a plurality of pieces. In the latter situation, the more pieces involved, the greater the cost in fabrication and assembly, thereby limiting their application.

In providing for a tamper proof closure for liquor or spirit containing bottles, it is desirable to provide a linerless one piece closure having straight side walls which assures that the tamper proof evidence remain on the bottle neck whose neck finish is of simple design and does not possess a stepped configuration.

There presently exists few, if any, single piece straight side wall type closures that do not involve the actual molding of the piece or other work on the closure such as a heat shrinking technique after it is placed on the container, to provide for tamper indication. A straight side closure has been proposed of multiple part construction with the attendant disadvantages noted in the above.

Usually stepped or offset closures are utilized since they facilitate their molding in such a manner to get the closure off the core, but even these usually involve complicated molding techniques and structures, aside from any asthetic considerations. Furthermore, the neck finishes are stepped which in the case of glass bottles add to the complexity of the product.

A further consideration in closure design is the material from which it is molded and the molding technique employed. In the case of polyethylene closures, they are usually made by a strip molding procedure. Since the threads of the closure are made of the same material, even if a tight threading with the container was used, the closure could stretch allowing it to "back-off" causing leaks. This is especially true if the container is made of a relatively dense material such as glass. To prevent leaks, it is usually necessary that a sealer or liner between the crown of the closure and the container be provided, adding to the cost of the device.

Further, even if one was to attempt to use the break off portion as a means of preventing "back-off", once this portion is broken, the closure would be incapable of providing an effective resealing of the container.

SUMMARY OF THE INVENTION

Accordingly, it is an object of the invention to provide for a single piece tamper indicating closure particularly suited for liquor and spirit containing bottles which together with the neck finish is relatively simple in construction, and which has a straight walled skirt with a breakaway portion thereon which will remain on the container when the closure is removed so as to indicate tampering.

Another object is to provide for the breakaway portion to remain on the container so as to be difficult to pry or remove thus inhibiting reuse of the bottle.

A yet another object of the invention is to provide for a tamper indicating closure which is readily moldable and removable from the core of the mold while allowing it to be made a number of resins including those that are relatively rigid and utilizable on containers made of glass or plastic.

The tamper indicating closure of the invention may be linerless and is provided with a breakaway portion or skirt that does not require special cams or lugs on the neck of the container. The neck is provided with a continuous chamfer retaining ring designed to retain the breakaway portion of the closure, thereby providing pilfer evidence. The crown or dome of the closure is flat and the side wall of the closure which contains the breakaway skirt has no protrusions on the exterior surface thereof. The breakaway skirt is separated from the remainder of the side wall by a frangible or serrated line portion. The inside wall of the breakaway skirt is provided with a continuous circumferentially extending wedge shaped ring. Locking lugs on the upper edge of the wedge shaped ring are adapted to engage with the retaining ring thereby providing extra pressure to cause the breakaway portion to become detached from the closure side wall as the closure is removed from the container. The breakaway portion will then remain relatively fixed on the container to provide the consumer with pilfer evidence. The neck finish, in addition to a threaded neck, includes an outwardly projecting continuous ring below the threads and is provided with an upper face extending downwardly relative to the axis of the neck and a lower face that is normal thereto. The angling down of the upper face allows the closure to be turned down onto the container without breaking the serrated portion. Once the skirt ring passes over the upper face it abuts the lower face with this face to engage with the lugs on the closure when the closure is removed to generate the necessary resistive force and pressures to cause the breakaway skirt to be severed along the serrated line.

Molding of the closure is readily provided with the wedge shape ring and lugs on the closure formed in such a way so as to allow the turning off of the closure from the core.

BRIEF DESCRIPTION OF THE DRAWINGS

Above mentioned and other features and objects of this invention will become more apparent by reference to the following description taken in conjunction with the accompanying drawings in which.

DETAILED DESCRIPTION OF THE PREFERRED EMBODIMENT

Figure 1:
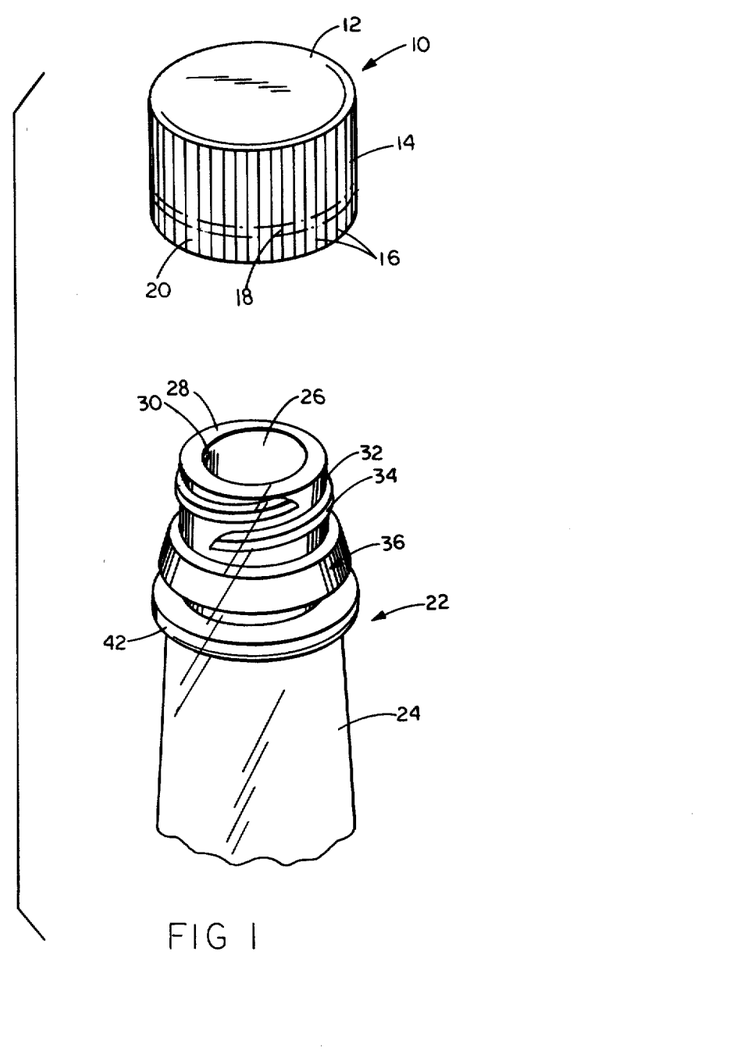
FIG. 1 is a perspective view of the closure and the neck of a container prior to placing the closure thereon incorporating the teachings of the invention.
Figure 5:
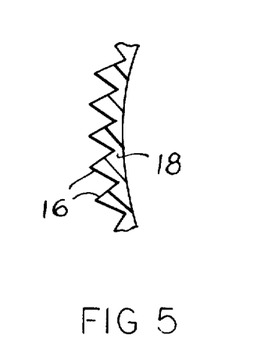
FIGS. 5 and 6 are partially sectional of the side wall of the closures along lines 5 and 6 respectively of FIG. 4.
Figure 6:
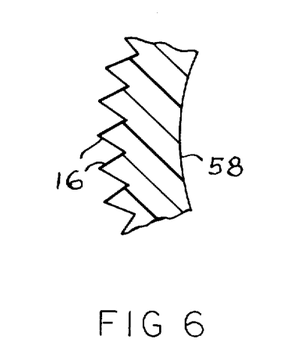

Referring now to the drawings, FIG. 1 shows the closure or cap 10 having a dome or crown 12 which is circular in form with a flat external surface. Extending downward from the crown is an annular skirt or wall 14 on which is located a plurality of outwardly tapered vertical ribs 16 with their bases on wall 14 shown most clearly in FIGS. 5 and 6, which facilitate grasping the closure. A portion of this wall is provided with a serrated line 18 below which will be referred to as a breakaway portion 20, as will be later discussed.

The closure 10 is intended to be fitted on a portion of neck 24 of a container or bottle 22 and may be made of a variety of materials i.e. resins, polyethylene or polypropylene, with the latter however being preferred for its strength. Also, while a bottle is shown, it should be understood that it is used merely as an example, features of the closure and may be incorporated on a variety of containers which may be made of a variety of materials, i.e., glass, plastic, metal, etc., with the closure preferably suited to be used on a glass container.

The neck 24 is provided with an opening 26 to allow the ingress and egress of material. An end surface 28 is provided about the opening, and defined by the inner 30 and outer surface or neck finish 32 of the bottle. As can be readily seen, the neck finish is simple and free from steps which complicate its design and construction, especially in glass bottles. Rearwardly located from end surface 28 is a helical thread 34. It is desirable that this thread be at an 8 rather than normally 6 pitch, so as to facilitate the prevention of back-off the closure.

A retaining or chamfer ring 36 is provided about the circumference of the bottle below the thread 34 as can best be seen in FIG. 2 and includes an upper face 38 extending angularly downward, preferably at an angle of 45° relative to the axis of the bottle, terminating at lower face 40, which is normal to said axis.

Rearwardly spaced from the ring 36 is neck ring 42 about the circumference of the bottle having an upper surface 44 oppositely located with respect to face 40. The lower face 40, upper surface 44 and outer surface 32 of the bottle serve to define a space in which the breakaway portion 20 of the closure is somewhat fixedly retained on the bottle 22 as evidence of tampering, as can be seen most clearly in FIGS. 2 and 3. In this regard, somewhat close tolerances are provided between the breakaway portion 20 and surface 44 and face 40, to assure that the tamper proof evidence remains on the bottle inhibiting its prying off.

Turning now more particularly to the closure 10, as can best be seen in FIGS. 2 through 6, there is provided a flat upper surface 46 of the dome 12 which, when turned down, engages the upper surface 28 of the bottle to seal the contents thereof. It might be noted that while a liner or sealant is not shown nor felt necessary it is readily includable between these surfaces if so desired.

Extending from the dome 12 is wall 14 having an internal surface 48 which is free of steps but upon which is located a helical thread 50 which corresponds, in a mating like relationship, to the thread 34 on the bottle so as to allow the closure to be screwed on and off. Similarly, thread 50 would preferably have an 8 pitch rather than the normal 6 so as to aid in the prevention of back-off which may cause leaks.

Rearwardly of the thread 50, an undercutting of the serrated line 18 is provided with the thickness of the wall 14 gradually decreases as shown by surface 52 which terminates at a thin portion which is formed serrated, providing the serrated line 18 about the circumference of the closure. This thin portion can best be seen in FIG. 5, which is taken along line 5 of FIG. 4, the thickness of which can vary along with the thickness of the ribs 16, all of which allows for varying the strength of this portion and the force necessary to cause the breakaway portion 20 to detach from the side wall 14.

Figure 2:
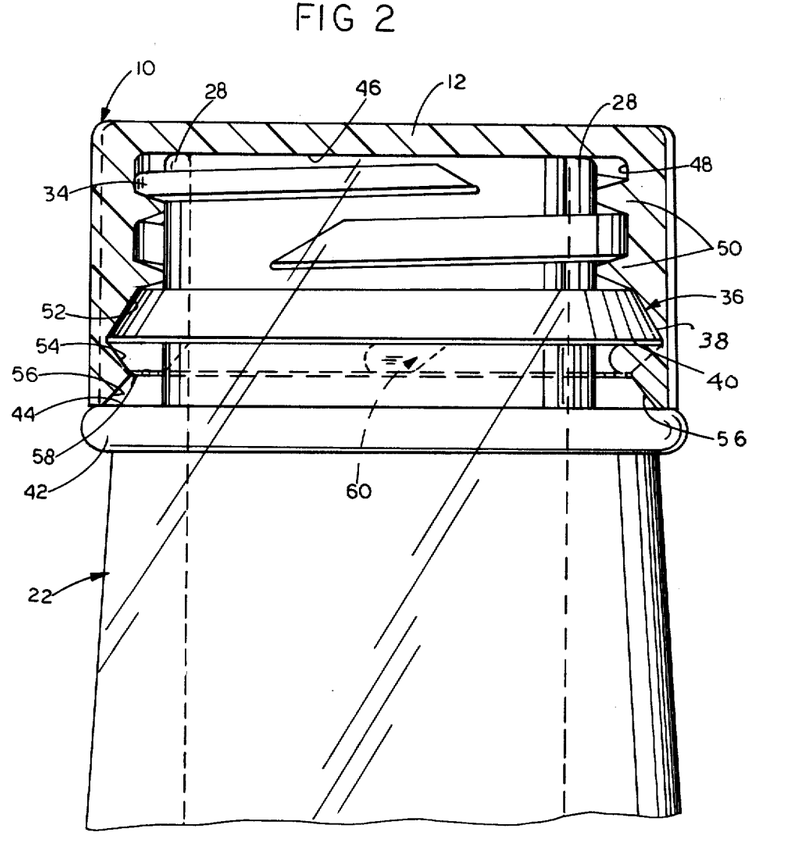
FIG. 2 is a substantially sectional view of the closure on the neck of the container.
Figure 3:
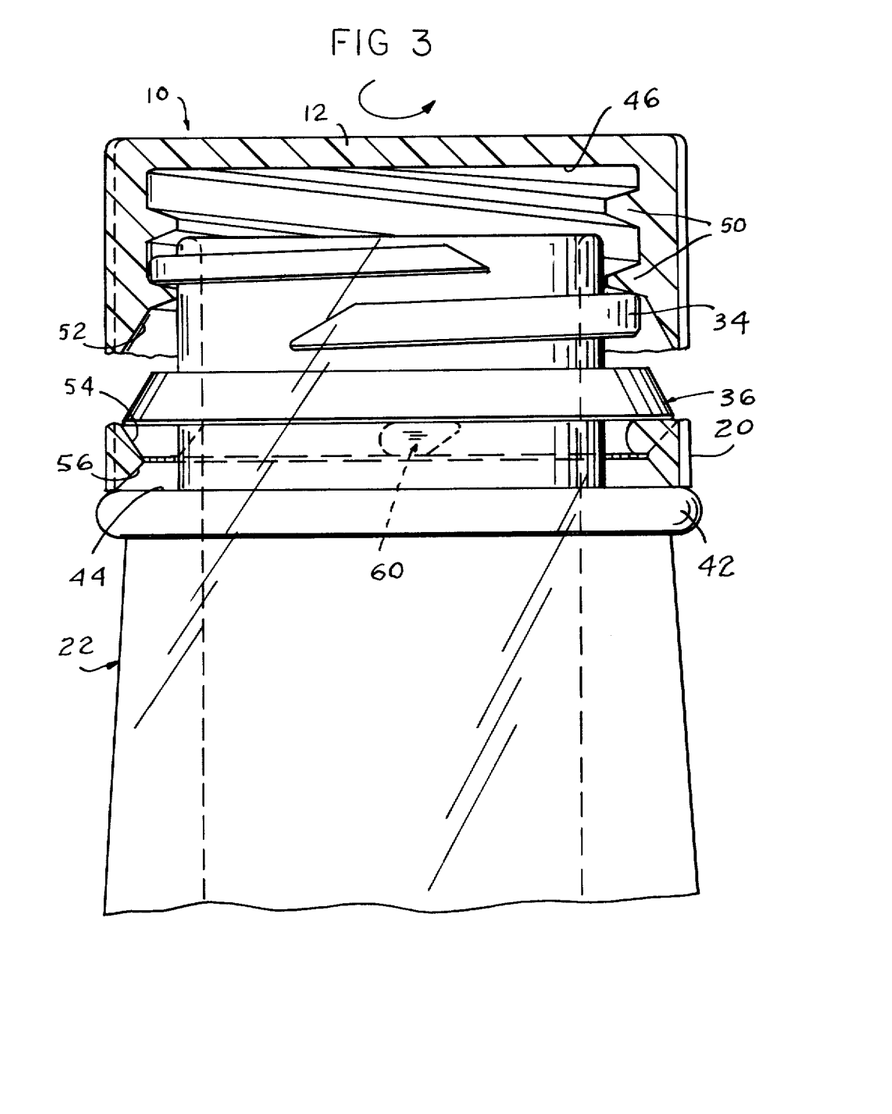
FIG. 3 is a substantially sectional view of the closure partially removed from the neck of the container with the breakaway portion remaining on the container.

The angle of surface 52 is shown to be the same as that of upper surface 38 so that when the closure is turned down they are positioned adjacent, in an abutting relationship as shown in FIG. 2.

The serrated line 18 serves to connect the breakaway portion 20 to the rest of the wall 14. The inside surface of the breakaway portion 20 is provided with a circumferentially extending wedge shape ring, which is formed by surface 54 and 56 which terminate in an apex 58 (shown cross sectionally on FIG. 6) which may be formed by molding angularly downward from the serrated line 18 and upward from the bottom of the breakaway portion, preferably at angles of 59° towards each other with respect to the side wall 14. This undercutting from the internal surface to the outside ribs 16 in this straight walled closure is different from the normal practices of undercutting from the outside surface inward as seen in the typical stepped closure.

In addition, there are provided five locking devices or lugs 60 located on the upper surface 54 of the wedge shaped ring which serves to provide extra pressure against the chamfer ring 36 during removal of the closure in which the breakaway portion 20 detaches from the wall 14 and remains on the bottle. The lugs 60 are made with an upper surface 62 which is flat and perpendicular to the wall 14, located just below the serrated line 18, with this surface 62 intended to abut surface 40 of ring 36. Extending downward from surface 62 is a surface 64 which angles outward from a point 66, being almost smooth with surface 54, to a raised curved portion 68, approximately as wide as the breakaway portion at apex 58. The angle formed by the raising of surface 64 along line 70 with surface 62 is approximately 35°.

The operation of the closure merely involves turning it down on to the bottle 22. During this, surface 56 contacts surface 38 and gradually causes the breakaway portion to expand outwardly to a point in which the apex 58 passes ring 36. This expansion is not sufficient to break the serrated line 18. Continued turning down causes the surface 64 of the lugs 60 to pass onto ring 36.

Once this occurs, surface 64, particularly at portion 68 is in contact with ring 36. Continued turning causes the lugs 60 to pass beyond ring 36 with the surface 62 now positioned under and in an abutting relationship with surface 40 of ring 36.

Figure 4:
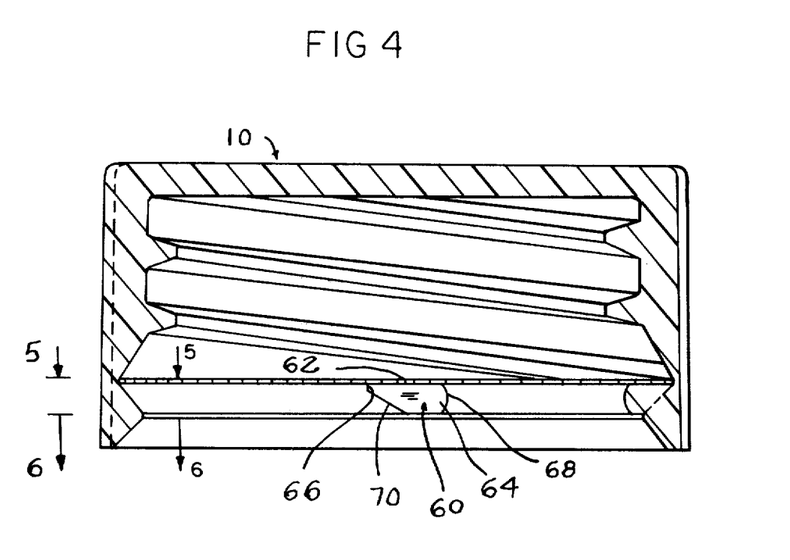
FIG. 4 is a sectional view of the closure incorporating the teachings of the invention.

An attempted removal of the closure will cause a breaking at the serrated line 18 due to the engagement of the breakaway portion 20, particularly the lugs 60, with the ring 36, as shown in FIG. 4. The breakaway portion 20 will remain on the bottle, between rings 36 and 42, to provide an indication to the consumer that the bottle has been opened.

Figure 7:
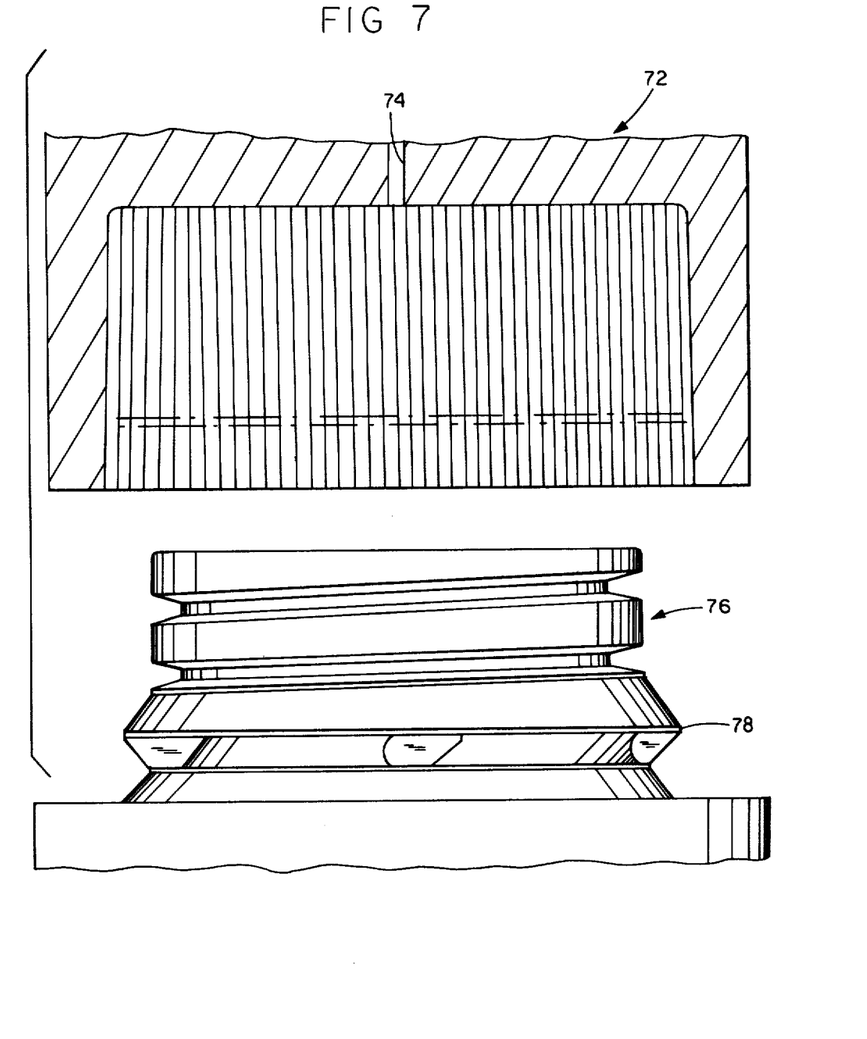
FIG. 7 is a partially sectional view of the mold and core for the closure incorporating the teachings of the invention.
Figure 8:
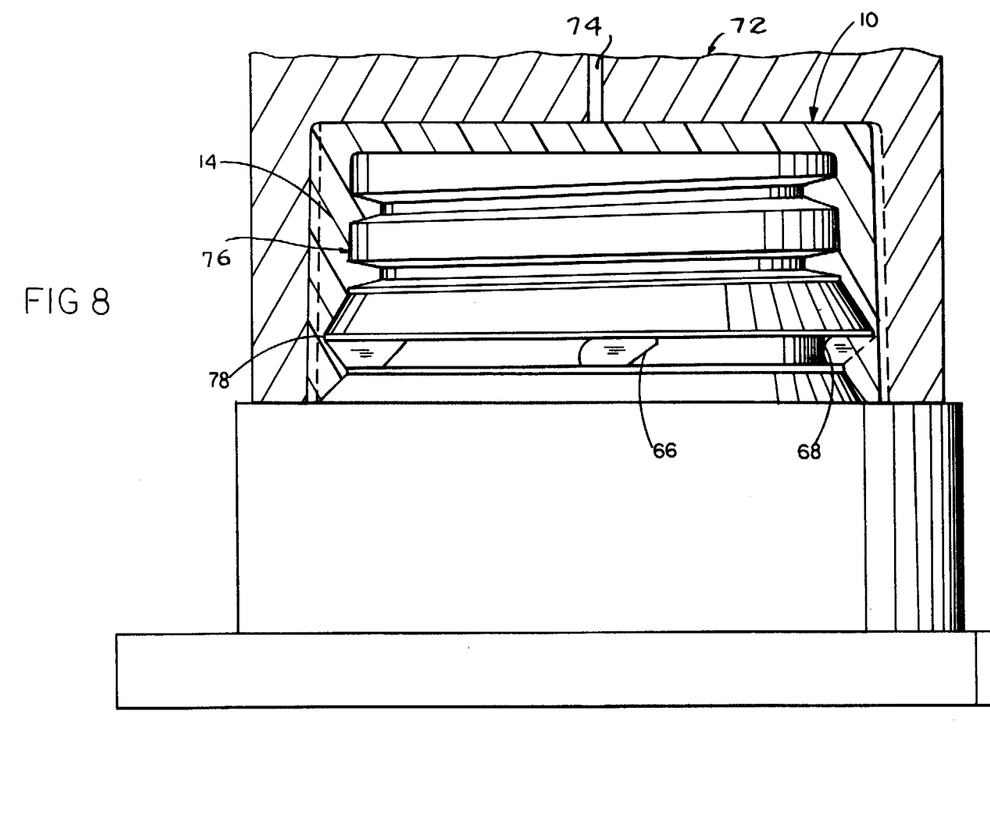
FIG. 8 is a substantial sectional view of the mold over the core with the closure formed therebetween incorporating the teachings of the invention.

Turning now to FIGS. 7 and 8 there is shown a means for readily molding the closure 10. In this regard, a mold 72 is provided, having an opening 74 to allow the material to be molded to enter the mold when it is placed over a core 76 so as to form the closure 10, as previously described and as seen in FIG. 8. The outer surface of the core compliments the internal surface of the closure 10, with the internal surface of the mold complimenting the external surface of the closure.

Once the closure is formed on the core 76, the mold 72 is lifted off. The closure 10 is then merely turned off of the core. In this regard, as this occurs the locking lugs 60 of the closure at the point 66, which is practically flush with surface 54, ease off the core gradually with the thickness of surface 64 increasing, again gradually expanding the breakaway portion 20 off the core, until the apex 58 and lugs 60 have passed the point of the widest diameter of the core at 78. The diameter of the apex 58 is sufficiently large so that it clears the threaded portion of the core, which may inhibit removal, and continued turning causes the closure to turn completely off of the core. Accordingly, the closure 10 may be readily molded and removed from the core of the mold without the necessity of a complicated procedure or collapsible core.

Also at point 78 during molding, the side wall of the closure is the thinnest and by using the ribs 16 in conjunction with a thin wall, readily allows for the formation of the serrated line 18 without any complicated procedure or pressing.

While a detailed description of the preferred embodiment has been described herein, it should not be restricted thereby, rather its scope should be determined by that of the appended claims.

What is claimed is:

1. A tamper proof closure for use in combination with a container with a neck finish having a threaded portion and a retaining means therebelow having a bottom surface, said closure comprising:
   a body having a substantially straight side wall having an inner surface with an internally threaded portion located on said inner surface and a breakaway portion therebelow;
   a frangible portion connecting said breakaway portion to said side wall;
   said breakaway portion adapted to slide over said retaining means as the closure is threaded onto the container and having a ring adapted to be disposed below of and adjacent to said retaining means when said closure is fully threaded onto the container;
   said ring having located thereon at least one locking means adapted to engage the bottom surface of the retaining means to secure the closure in place when the closure is fully threaded onto the container;
   whereby when the closure is unthreaded from the container, the breakaway portion will be severed from the body at the frangible portion by the retaining means acting on the ring leaving said breakaway portion on said container as an indication of tampering.

2. The closure is accordance with claim 1 wherein the frangible portion is formed by an undercut in the sidewall which extends outwardly from said inner face.

3. The closure is accordance with claim 1 wherein said inner face and said neck finish are free of steps.

4. The closure is accordance with claims 1, 2 or 3 in which said ring has an upper and lower surface with said locking means located on said upper surface and said frangible portion located adjacent said upper surface.

5. The closure in accordance with claim 4 wherein said ring is wedge shaped with said upper and lower surfaces forming adjacent sides of said wedge with the thickest portion of said ring being at the apex of the wedge.

6. The closure in accordance with claim 5 wherein said locking means has an upper surface substantially normal to said side wall and adjacent to said frangible portion, the bottom surface of the retaining means being normal to the center axis of the container, wherein said upper surface of the locking means is adapted to engage said bottom surface of the retaining means to secure the closure in place when the closure is completely threaded onto the container.

7. The closure in accordance with claim 6 wherein the retaining means includes an upper surface which angles downwardly and away from said container terminating at the bottom surface facilitating the sliding of the breakaway portion thereover.

8. The closure in accordance with claim 7 wherein the upper surface of the retaining means angles downward at approximately 45° with respect to the center axis of the container and the upper and lower surfaces of the ring angle toward each other at approximately 59° with respect to the side wall of the container.

9. The closure in accordance with claim 1 wherein said container has a neck ring located below said retaining means with the breakaway portion located between said neck ring and retaining means when the closure is fully threaded onto the container.

10. The closure in accordance with claim 9 wherein the neck ring and retaining means are formed so as to inhibit removal of the breakaway portion from the container when said portion is located between the ring and means.

11. The closure in accordance with claim 1 wherein said closure is a single piece of intergral construction.

12. The closure in accordance with claim 2 wherein said side wall has located on its external surface a plurality of ribs, and said frangible portion extends outwardly to said ribs.

13. The closure in accordance with claim 1 wherein said breakaway portion is formed so as to permit the closure to be unscrewed from its forming apparatus without severing said frangible portion.

14. The closure in accordance with claim 13 wherein said locking means is formed having a surface essentially smooth at a first point with the upper surface of the ring and gradually raised from said upper surface of the ring to a second point with the rotational direction for unscrewing the closure from the forming apparatus being in the direction of the second point to the first point.

15. The closure in accordance with any one of claim 1 wherein said closure is linerless and includes a dome from which extends said side wall and said closure is constructed of a plastic material.

16. A tamper proof closure for use in combination with a container with a neck finish having a threaded portion and a retaining means therebelow, said closure comprising:
- a body having a substantially straight side wall having an inner surface with an internally threaded portion located on said inner surface;
- a breakaway portion with a frangible portion connecting said breakaway portion to said side wall;
- said breakaway portion adapted to slide over said retaining means as the closure is threaded onto the container and having a ring thereon;
- said ring being positioned on the closures interior and approximating a wedge shape configuration having upper and lower surfaces;
- said containers neck having a retaining means thereon, said retaining means includes a flange having an upper surface which slopes downwardly and projects outwardly toward frangible portion terminating in a bottom surface, said container having an annular bead located below said bottom surface with the ring located between said annular bead and said bottom surface when the closure is fully placed on the container, and said bead, ring and retaining means being of close dimensional tolerances such that the ring is substantially fixed therebetween thereby inhibiting the introduction of an implement therebetween so as to prevent prying off of the ring from the container; and
- whereby when the closure is unthreaded from the container, the breakaway portion will be severed from the body at the frangible portion by the retaining means acting on the ring leaving said breakaway portion on said container as an indication of tampering.

17. The closure in accordance with claim 16 wherein the frangible portion is formed by an undercut in the sidewall which extends outwardly from said inner surface.

18. The closure in accordance with claims 16 or 17 wherein said inner face and said neck finish are free of steps.

19. The closure in accordance with claims 16 or 17 wherein the upper surface of the retaining means angles downward at approximately 45° with respect to the center axis of the container and the upper and lower surfaces of the ring angle toward each other at approximately 59° with respect to the side wall of the container.

20. The closure in accordance with claims 16 or 17 wherein said closure is a single piece of integral construction formed from a plastic material.

21. The closure in accordance with claims 16 or 17 wherein said side wall has located on its external surface a plurality of ribs, and said frangible portion extends outwardly to said ribs.

22. A tamper proof closure for use in combination with a container with a neck finish having a threaded portion and a retaining means therebelow having a bottom surface, said closure comprising:
- a body having a substantially straight side wall having an inner surface with an internally threaded portion located on said inner surface and a plurality of ribs on its outer surface;
- a breakaway portion with a frangible portion connecting said breakaway portion to said side wall, said frangible portion extends outwardly to said ribs;
- said breakaway portion adapted to slide over said retaining means as the closure is threaded onto the container and having a ring adapted to be disposed below of and adjacent to said retaining means when said closure is fully threaded onto the container;
- said ring being positioned on the closures interior and adapted to be disposed adjacent to the bottom surface of the retaining means when the closure is fully threaded onto the container;
- whereby when the closure is unthreaded from the container, the breakaway portion will be severed from the body at the frangible portion by the retaining means acting on the ring leaving said breakaway portion on said container as an indication of tampering.

23. The closure in accordance with claim 22 wherein the frangible portion is formed by an undercut in the side wall which extends outwardly from said inner surface.

24. The closure in accordance with claim 22 wherein said plurality of ribs are vertically positioned on said side wall and said frangible portion being normal to said ribs.

25. The closure in accordance with claims 22, 23 and 24 wherein said breakaway portion is formed with means to permit the closure to be unscrewed from its forming apparatus without severing said frangible portion.

26. A tamper proof closure for use in combination with a container with a neck finish having a threaded portion and a retaining means therebelow having a bottom surface, said closure comprising:
- a top and bottom end with said closure having an uninterrupted outer surface from its top to bottom end;
- a body having a substantially straight side wall downwardly extending from the top end having an inner surface with an internally threaded portion located on said inner surface;
- a breakaway portion positioned at the bottom end with a frangible portion connecting said breakaway portion to said side wall;
- said frangible portion being formed by an undercut in the side wall which extends outwardly from said inner surface;
- said breakaway portion adapted to slide over said retaining means as the closure is threaded onto the container and having a ring adapted to be disposed below of and adjacent to said retaining means when said closure is fully threaded onto the container;
- said ring being positioned on the closures interior and being adapted to be disposed adjacent to the bottom surface of the retaining means when the closure is fully threaded onto the container; and
- whereby when the closure is unthreaded from the container, the breakaway portion will be severed from the body at the frangible portion by the retaining means acting on the ring leaving said breakaway portion on said container as an indication of tampering.

* * * * *